United States Patent
Elliott et al.

(10) Patent No.: US 8,267,350 B2
(45) Date of Patent: Sep. 18, 2012

(54) JAM-TOLLERANT ACTUATOR

(75) Inventors: Nicholas Elliott, Bristol (GB); Arnaud Didey, Bristol (GB)

(73) Assignee: Airbus Operations Limited, Bristol (GB)

( * ) Notice: Subject to any disclaimer, the term of this patent is extended or adjusted under 35 U.S.C. 154(b) by 813 days.

(21) Appl. No.: 12/374,136

(22) PCT Filed: Aug. 17, 2007

(86) PCT No.: PCT/GB2007/050495
§ 371 (c)(1),
(2), (4) Date: Jan. 16, 2009

(87) PCT Pub. No.: WO2008/023198
PCT Pub. Date: Feb. 28, 2008

(65) Prior Publication Data
US 2009/0314884 A1 Dec. 24, 2009

(30) Foreign Application Priority Data

Aug. 23, 2006 (GB) .................................. 0616730.8

(51) Int. Cl.
*B64C 25/50* (2006.01)
*B64C 9/00* (2006.01)
*B64C 25/10* (2006.01)
*B60W 10/10* (2012.01)

(52) U.S. Cl. .................. 244/99.2; 244/99.9; 244/102 R; 244/50; 477/27

(58) Field of Classification Search .................... 244/50, 244/99.2, 100 R, 102 R; 477/27, 29
See application file for complete search history.

(56) References Cited

U.S. PATENT DOCUMENTS
2,193,305 A * 3/1940 Thompson .................... 477/150
(Continued)

FOREIGN PATENT DOCUMENTS
EP 0826902 B1 4/2002
(Continued)

OTHER PUBLICATIONS
ISR for PCT/GB2007/050495 dated Nov. 28, 2007.
(Continued)

*Primary Examiner* — Branon Painter
*Assistant Examiner* — Elizabeth A Plummer
(74) *Attorney, Agent, or Firm* — Lowe, Hauptman, Ham & Berner, LLP

(57) ABSTRACT

An actuator, comprises a housing, a first prime mover for producing rotary motion, a first gearbox arranged to convert in use the rotary motion from the first prime mover into rotary motion having higher torque and lower speed. The first gearbox comprises a casing mounted for rotation relative to the housing of the actuator and a second gearbox arranged to convert rotary motion of the casing of the first gearbox into rotary motion having lower torque and higher speed.

A brake is arranged to act on the rotary motion having lower torque and higher speed from the second gearbox. In use when the first gearbox is not jammed, the brake may be applied to resist relative rotation between the casing of the first gearbox and the housing of the actuator.

When the first gearbox is jammed, the brake may be released thereby allowing the casing of the first gearbox to rotate relative to the housing of the actuator. The actuator may thereby be jam-tolerant. A second motor may also be provided.

17 Claims, 3 Drawing Sheets

U.S. PATENT DOCUMENTS

| | | | |
|---|---|---|---|
| 2,427,168 A | 6/1943 | Thompson et al. | |
| 3,904,153 A * | 9/1975 | Watts | 244/50 |
| 3,986,412 A | 10/1976 | Farley | |
| 4,179,944 A * | 12/1979 | Conner | 74/89.26 |
| 4,215,592 A | 8/1980 | Calvert | |
| 4,488,744 A | 12/1984 | Bubeck et al. | |
| 4,521,707 A * | 6/1985 | Baker | 310/80 |
| 4,603,564 A * | 8/1986 | Kleinhany et al. | 70/277 |
| 4,607,180 A * | 8/1986 | Stoody | 310/80 |
| 4,611,787 A * | 9/1986 | May et al. | 254/267 |
| 4,614,128 A * | 9/1986 | Fickler | 74/89.31 |
| 4,637,272 A * | 1/1987 | Teske et al. | 74/89.26 |
| 4,856,379 A | 8/1989 | Jafarey | |
| 4,858,490 A | 8/1989 | Grant | |
| 5,071,397 A | 12/1991 | Grimm | |
| 5,092,539 A * | 3/1992 | Caero | 244/99.9 |
| 5,109,730 A * | 5/1992 | Zahn et al. | 477/121 |
| 5,120,285 A | 6/1992 | Grimm | |
| 5,128,688 A * | 7/1992 | West | 343/766 |
| 5,144,851 A * | 9/1992 | Grimm et al. | 74/89.26 |
| 5,152,381 A | 10/1992 | Appleberry | |
| 5,214,972 A * | 6/1993 | Larson et al. | 74/89.26 |
| 5,518,466 A | 5/1996 | Tiedeman | |
| 5,779,587 A | 7/1998 | Reilly | |
| 6,231,012 B1 * | 5/2001 | Cacciola et al. | 244/213 |
| 6,446,519 B1 * | 9/2002 | Biester | 74/89.16 |
| 6,453,761 B1 * | 9/2002 | Babinski | 74/89.34 |
| 6,791,215 B2 * | 9/2004 | Tesar | 310/12.24 |
| 6,811,118 B2 * | 11/2004 | Collet et al. | 244/102 SL |
| 6,820,715 B2 * | 11/2004 | Laurent et al. | 180/443 |
| 6,981,428 B2 * | 1/2006 | Donald et al. | 74/89.26 |
| 7,190,096 B2 * | 3/2007 | Blanding et al. | 310/112 |
| 2005/0103928 A1 | 5/2005 | Flatt | |
| 2006/0113933 A1 * | 6/2006 | Blanding et al. | 318/116 |
| 2006/0266146 A1 * | 11/2006 | Waide | 74/424.92 |
| 2007/0068291 A1 * | 3/2007 | Beatty et al. | 74/89.26 |
| 2010/0012779 A1 * | 1/2010 | Collins | 244/102 R |
| 2010/0038478 A1 * | 2/2010 | Knight | 244/102 R |
| 2010/0096498 A1 * | 4/2010 | McKay | 244/99.2 |

FOREIGN PATENT DOCUMENTS

| | | |
|---|---|---|
| EP | 1310699 A2 | 5/2003 |
| JP | 2000110896 A | 4/2000 |
| WO | 00/29286 A1 | 5/2000 |

OTHER PUBLICATIONS

British Search Report for GB0616730.8 dated Dec. 1, 2006.

* cited by examiner

JAM-TOLLERANT ACTUATOR

RELATED APPLICATIONS

The present application is based on International Application Number PCT/GB2007/050495 filed Aug. 17, 2007, and claims priority from British Application Number 0616730.8, filed Aug. 23, 2006, the disclosures of which are hereby incorporated by reference herein in their entirety.

BACKGROUND OF THE INVENTION

The present invention relates to an actuator and in particular, but not exclusively, to a jam-tolerant electromechanical actuator for moving an aircraft component.

Actuators may be used to cause movement of aircraft components such as the landing gear of an aircraft, for example steering the nose landing gear. Such actuators should of course be of high integrity and should have a very low risk of failure. For example, it is important for actuators to have at least two modes of operation so that there is for example a secondary, or emergency, mode of operation that facilitates movement of the aircraft component in the event of a loss of, or failure in, the normal mode of operation. Such a secondary, or emergency, mode of operation may provide for active movement of the aircraft component or may simply allow for the aircraft component to be moveable despite being connected to the actuator (in the context of a landing gear steering actuator, the secondary, or emergency, mode of operation may consist of allowing free-castoring of the landing gear).

There are two main types of electromechanical actuators, namely linear actuators and rotary actuators. Linear actuators typically feature an electric motor coupled to a reduction gear-box connected to a roller or ball screw. The high-speed/low-torque rotating motion of the electric motor is converted into low-speed/high-thrust linear motion. Rotary actuators also typically feature an electric motor connected to a reduction gear-box, in this case the high-speed/low-torque rotating motion of the electric motor is converted into low-speed/high torque rotary motion. Depending on the application either linear or rotary motion may be needed. For example, the extension/retraction system of an aircraft landing gear may require a linear actuator, whereas the operation of doors or the nose wheel steering of an aircraft may require a rotary actuator.

DESCRIPTION OF THE RELATED ART

Actuators used on prior art aircraft have often been in the form of hydro-mechanical actuators. There is a desire to reduce the reliance on hydraulic systems in large commercial aircraft and thus there is currently a desire to use electric actuators, where previously hydro-mechanical actuators were used. Electro-mechanical actuators, whether linear or rotary, include moving parts such as gears in gearboxes that may cause mechanical jamming of the actuator that prevents the actuator from operating efficiently and/or safely. It is therefore desirous to provide an electromechanical actuator that is at least partially tolerant to such jams.

There are many proposals in the prior art relating to jam-tolerant actuator design. Examples of such proposals are disclosed in US 2005/0103928, U.S. Pat. Nos. 3,986,412, 4,215, 592, 4,488,744, 4,858,490, 5,071,397, 5,120,285, 5,152,381, 5,518,466, and 5,779,587. However, such proposals suffer from various disadvantages.

Certain proposals rely on engagement/disengagement of intermeshing gears, for example dog clutches, or other releasable high-torque coupling mechanisms requiring complicated mechanisms in the event of jamming of the actuator (see US 2005/0103928, U.S. Pat. Nos. 4,488,744, 5,071,397, and 5,779,587 for example).

Certain proposals rely on the breaking of parts of the actuator, designed to fail on jamming of the actuator, in order for the actuator to be jam-tolerant (see for example U.S. Pat. No. 5,518,466, which describes a system including shear lugs that are designed to break in the event of a jam). Such systems are fail-once systems and always require the replacement of at least part of the actuator, if the actuator is to again operate in its principal mode of operation. Such systems are also dependent on lugs failing the instant a torque exceeds a given threshold level. The choice of a single threshold level may mean that the shear lugs fail when there is no jam and/or that the shear lugs do not fail soon enough in the event of a partial or full jam.

Certain proposals are simply too bulky or heavy for use in certain applications (see for example U.S. Pat. No. 4,215, 592).

Certain proposals limit the output motion able to be provided by the actuator to motion over a restricted range of angles (typically less than one complete revolution of output motion), for example as a result of cabling interfering with greater amounts of rotation (for example see U.S. Pat. Nos. 5,152,381, 4,858,490 and 3,986,412). For example, certain proposals appear possibly to require the rotation of one or more prime movers in at least one mode of operation of the actuator.

Certain proposals are reliant on the provision of electric power in the event of failure of the primary mode of operation, and/or require the provision of more than one prime mover. Such requirements may in certain applications be disadvantageous as a result of the reliance of a power source being available and/or the requirement for plural prime movers and therefore extra weight.

Certain proposals are limited by means of the gear ratios of the gearing within, and therefore the torques provided by, the actuator. For example, the actuator of U.S. Pat. No. 5,120, 285, appears to be limited in this way. The actuator of U.S. Pat. No. 5,120,285 appears also to be susceptible to events that cause both the primary and secondary modes of operation to be inoperable.

The present invention seeks to provide an actuator that mitigates one or more of the above-mentioned disadvantages. It will of course be appreciated that it is within the scope of the present invention to provide an actuator that mitigates only one of the above-mentioned disadvantages. Alternatively or additionally, the present invention seeks to provide an improved actuator, for example an actuator having greater flexibility in terms of the possible applications of the actuator in comparison to the actuators proposed in at least some of the above-mentioned prior art documents. Alternatively or additionally, the present invention seeks to provide a jam-tolerant actuator for use on an aircraft, that does not need to rely on a central hydraulic system of the aircraft, the actuator for example being in the form of an electromechanical rotary actuator.

SUMMARY OF THE INVENTION

The present invention provides an actuator, wherein the actuator comprises
a housing,
a prime mover for producing rotary motion,
a first gearbox arranged to convert in use the rotary motion from the prime mover into rotary motion having higher torque and lower speed, the first gearbox comprising a casing mounted for rotation relative to the housing of the actuator, a second gearbox arranged to convert rotary motion of the casing of the first gearbox into rotary motion having lower torque and higher speed, and a brake arranged to act on the rotary motion having lower torque and higher speed from the second gearbox, whereby in use (i) when the first gearbox is not jammed, the brake may be applied to resist relative rotation between the casing of the first gearbox and the housing of the actuator and (ii) when the first gearbox is jammed, the brake may be released thereby allowing the casing of the first gearbox to rotate relative to the housing of the actuator.

The actuator is therefore jam-tolerant in that in the event that the first gearbox fails, for example if it jams, the output of the actuator is not jammed, because the housing of the first gearbox may be allowed to rotate. The actuator may also be relatively lightweight and compact, because neither a large brake nor a large motor are required for the operation of the actuator, as a result of the provision of both the first gearbox and the second gearbox. The first and second gearboxes may be configured such that the probability of both gearboxes jamming simultaneously is negligible. The prime mover may also be designed such that there is negligible risk of the prime mover failing in such a way as to cause a jam in the prime mover. The actuator may therefore be configured to be jam-tolerant with a negligible risk of causing a permanent jam during operation at its output.

The prime mover may be fixed relative to the housing. The prime mover may be in the form of an electric motor.

The prime mover and the first gearbox may be the primary means for causing the actuator to operate. The second gearbox may form at least part of a back-up means for use in the event of failure of the prime mover or the first gearbox. The first and second gearboxes may therefore have different mechanical properties. The second gearbox may for example have a gear ratio lower than the first gearbox. By this means, the second gearbox may be back-drivable, whereas the first gearbox need not be back-driveable. The second gearbox may have a mass lower than the first gearbox.

The gear ratio of the first gearbox is preferably 10:1 or greater. For example, the gear ratio may be greater than 20:1, or even greater than 30:1. In an embodiment of the invention, the actuator is configured such that the first gearbox has a gear ratio of at least 50:1 and is able to generate a torque of at least 8,500 Nm. Similarly, the gear ratio of the second gearbox is preferably 10:1 or greater. For example, the gear ratio may be greater than 20:1, or even greater than 30:1. As mentioned above, the second gearbox may have a gear ratio lower than that of the first gearbox. The choice of gear ratios in the first and second gearboxes may be based on different requirements. For the first gearbox the ratio may be chosen in consideration of the size and weight of the motor/gearbox combination For the second gearbox, the ratio may be chosen in consideration firstly of the need for a low ratio of back-driveability and secondly of the need for a sufficiently high ratio to reduce the brake torque requirement.

The first and/or second gearboxes may of course be in the form of any suitable gearbox-type. The or each gearbox may for example be in the form of, or comprise, a worm drive, harmonic drive, planetary, epicyclic, hypoid, helical or any other suitable gearbox type or arrangement. The actuator may be so configured that the output of the first gearbox must in use be able to produce output rotation over a range of at least ±180 degrees (i.e. at least one full rotation). Preferably, the actuator is able to provide multiple full rotations at the output of the first gearbox.

The actuator is preferably reconfigurable. Thus, if the jamming of the first gearbox can be remedied without the need for spare parts, then the actuator may be repaired without the need for any parts of the actuator being replaced. For example, the actuator preferably has no parts that are required to break in order to allow the actuator to function in a jam condition. The actuator may thus be used again after the first gearbox has jammed, solely by means of remedying the cause of the jam. This functionality may be contrasted with certain actuators of the prior art which require replacement of other parts, which are designed to fail in the event of a jam.

The actuator is preferably back-driveable, and more preferably back-driveable in the event of the first gearbox jamming. For example, both the second gearbox and the prime mover are preferably back-driveable. The second gearbox and the prime mover may be arranged in use to be back-driven in the event of jamming of the first gearbox. For example, the output of the first gearbox may be rotated by other means, requiring free movement of the second gearbox and prime mover, so as not to place any potentially damaging loads on the actuator whilst its output is rotated by such other means. The first gearbox need not of course be able to be back-driveable in the event of a jam of the first gearbox. Also, the first gearbox may be arranged not to be back-driveable, in particular when the first gearbox is not jammed.

The brake may be in the form of an electrically powered brake. The brake is preferably a "power-on" brake, such that in the event of a power failure, the brake automatically releases.

A damping mechanism may be provided. The motion of the actuator, at least when the first gearbox is jammed, is preferably damped by means of such a damping mechanism. For example, the damping mechanism may be so arranged that when the first gearbox is jammed and the brake is released, the casing of the first gearbox is allowed to rotate with damped motion relative to the housing of the actuator. The damping mechanism may utilise hydraulic damping means. The damping mechanism may utilise inertial damping means. The damping mechanism may utilise a passive damping device. For example, electromagnetic damping may be provided. The brake may for example incorporate a damping mechanism. For example, the brake may be comprised as a part of a larger braking means, which also comprises the damping mechanism. The damping mechanism may utilise an active damping device. The damping mechanism may comprise an electric motor. Such a motor could provide active damping by using a controller and/or passive damping by using a controller or passive damping by shorting the motor windings.

The actuator may operate in a passive manner in the event of the first gearbox becoming jammed. The feature of the actuator not providing driving motion in the event of jamming of the first gearbox may allow the actuator to be relative lightweight. In contrast to this potentially lightweight solution, if driving motion in a back-up or secondary mode of operation were required, extra weight may need to be added to the actuator. It might for example be necessary to provide a second prime mover. Alternatively, it might be necessary to provide further mechanical mechanisms to decouple the first gearbox and prime mover and recouple the prime mover with the output of the actuator (for example via the secondary gearbox). Providing an actuator able to provide driving motion in its back-up/secondary mode of operation is within the scope of the present invention, as is clear from what follows. It is preferred however that embodiments of the present invention do not have or need decoupling mechanisms that are required to decouple elements under load.

Alternatively, or additionally, the actuator may be able to operate in an active manner in the event of the first gearbox becoming jammed, for example continuing to drive the output of the actuator. The drive may be provided by means of the prime mover first mentioned above (hereinafter the "first prime mover"). Alternatively, a second prime mover may be provided. Providing such a second prime mover may have the benefit of providing better redundancy in the actuator and may also reduce the need for complicated mechanisms for decoupling the first prime mover from the first gearbox when jammed. The actuator may include a second prime mover for producing rotary motion. The second prime mover may be associated with the second gearbox. For example, the second gearbox may be arranged in use to convert the rotary motion from the second prime mover into rotary motion having higher torque and lower speed.

The second prime mover may be arranged such that in the event of the first gearbox being jammed (when of course the brake may be released thereby allowing the casing of the first gearbox to rotate relative to the housing of the actuator) rotary motion from the second prime mover is able to be converted by the second gearbox into rotary motion of the casing of the first gearbox (such rotary motion having higher torque and lower speed than the output of the second prime mover), the rotary motion produced thus being provided at the same output as the rotary motion produced when the first gearbox is not jammed. Of course, the second prime mover may be arranged also to allow, when the first gearbox is not jammed, rotary motion from the first prime mover to be converted by the first gearbox into rotary motion having higher torque and lower speed, whilst the brake resists relative rotation between the casing of the first gearbox and the housing of the actuator.

The second prime mover may be an electric motor. The first prime mover may be larger, more massive and/or more powerful than the second prime mover. The second gearbox and second prime mover may be considered as back-up means in the event of failure of the first prime mover or the first gearbox.

The actuator may include a jamming mechanism, which is able in use to jam the first gearbox. In the event of a partial jam of the first gearbox, in which the first gearbox still functions but at significantly reduced efficiency, the jamming mechanism may be used to fully jam the first gearbox so that the actuator may function as if the first gear-box had fully jammed. The actuator may of course be arranged to function best in either of two distinct conditions, namely the first gearbox being free and the first gearbox being fully jammed. It may therefore be desirable to reduce the likelihood of the first gearbox being in any other condition, for example partially jammed. The jamming mechanism may be so arranged that when used it assists or causes the casing of the first gearbox to rotate at the same speed as the input motion. The jamming mechanism may for example be able to substantially prevent the gearbox casing from rotating relative to rest of gearbox. The jamming mechanism may for example comprise a clutch, brake or other means able to engage and disengage parts of the actuator in a manner (a) to facilitate free driving of the first gearbox (when not otherwise jammed) and (b) to substantially lock the gearbox so that rotation of the input shaft causes corresponding rotation of the casing and output of the first gearbox.

The actuator may comprise control unit, for example in the form of or comprising a jam detection means, arranged to detect jamming of the first gearbox. The jam detection means may for example be arranged to monitor the efficiency of the actuator. For example, the jam detection means may monitor the output of the actuator. The measured output of the actuator may be compared with the expected output, and if there is a significant discrepancy it may be assumed that the efficiency of the actuator has been compromised by means of a jam.

The actuator is preferably structured to be suitable for causing movement of an aircraft component. The aircraft component may for example be a landing gear. In that case, the actuator may be in the form of a steering actuator. The aircraft component may alternatively be a flight control surface, such as for example a slat or flap. The aircraft component may alternatively be a door, for example a landing gear bay door. The output of the actuator may be connected to a component to be moved by means of a further gear mechanism. The further gear mechanism may convert the output of the actuator into even higher torque lower speed motion. The gear ratio of the further gear mechanism may be greater than 4:1 for example. Thus, in order to cause motion of the component over a range of 100 degrees or more, there may need to be motion of the output of the actuator of significantly more than one whole revolution. In certain applications, the actuator may need to be able to output over two complete revolutions, or more.

The actuator may for example form part of an aircraft. In such a case, the housing of the actuator may be fixed to resist rotation relative to an adjacent structure of the aircraft.

The present invention further provides a landing gear assembly including a landing gear leg, for example a nose landing gear for supporting at least one wheel of an aircraft, and an actuator arranged to steer the wheel, for example by rotating the leg about its axis, the actuator being an actuator according to any aspect of the invention described herein. The present invention yet further provides an aircraft including such a landing gear assembly. The present invention also provides an aircraft including an aircraft component and an actuator arranged to move the aircraft component, the actuator being an actuator according to any aspect of the invention described herein. The aircraft may be heavier than 50 tonnes dry weight, and more preferably heavier than 200 tonnes dry weight. The aircraft may be of a size equivalent to an aircraft designed to carry more than 75 passengers, and more preferably more than 200 passengers. It will of course be appreciated that features of aspects of the invention relating to the actuator of the invention may be incorporated into the landing gear assembly and the aircraft of the invention.

It will of course be appreciated that the component parts of the actuator of the present invention may be manufactured separately in one or more countries and then assembled in a different country. For that reason, it is within the scope of the present invention to provide an actuator according to any aspect of the invention described herein, but without the provision of the prime mover (or prime movers) of the actuator. Such a prime mover may of course be mounted in or on the actuator after manufacture of the actuator. For example the actuator need only be fully assembled when mounting the actuator in situ ready for use. Thus, there is also provided a kit of parts for manufacturing an actuator according to any aspect of the invention described herein. The kit of parts may comprise at least the housing, the first gearbox, the second gearbox, and the brake. The kit may also include the one or more prime movers. It will of course be appreciated that features of aspects of the invention relating to the actuator of the invention may be incorporated into this aspect of the invention relating to a kit of parts.

There is further provided a method of moving a component, wherein the method comprises the steps of providing input rotary motion having a first torque to a first gearbox, applying a counter-torque to substantially prevent rotary motion of the whole of the first gearbox, the counter-torque being applied via a second gearbox, the first gearbox outputting rotary motion having a second torque, higher than the first torque, which causes the component to move, and then, after jamming of the first gearbox, releasing the counter-torque applied via the second gearbox.

The whole of the first gearbox may thus be allowed to rotate, thereby preventing the jamming of the first gearbox from precluding movement of the component.

The counter-torque may be applied by means of a brake applied at the input to the second gearbox, the output of the second gearbox providing a counter-torque having a higher torque as a result of the gear ratio of the second gearbox.

The jamming of the first gearbox may be in the form of a partial jam. In such a case, the method may include a step of effectively fully jamming the first gearbox (for example, if deemed necessary). For example, the output motion of the first gearbox may be made to match the input motion of the first gearbox and vice versa. The gear ratio of the first gearbox may thus effectively convert to a one-to-one gear ratio. This may be achieved by means of coupling the input and output of the gearbox when in the jammed condition, for example by means of a brake or a clutch or the like.

The method may include a step, performed after jamming of the first gearbox, of moving the component by means other than via the first or second gearboxes. The moving of the component may cause movement of the second gearbox. The movement of the component is preferably damped.

The method may include a step, performed after jamming of the first gearbox, of moving the component by means of providing input rotary motion to the second gearbox.

The method may be performed such that the component is able to move, after jamming of the first gearbox, without needing to irreversibly break or change any other parts used in the performance of the method.

The method may include a step of monitoring for jamming of the actuator or a part thereof, for example of the first gearbox. The method may include a step of detecting jamming of the first gearbox and then consequently causing the counter-torque applied via the second gearbox to be released.

It will of course be appreciated that features of the variously described aspects of the invention may be incorporated into other aspects of the invention. For example, aspects of the invention relating to the actuator may be incorporated into aspects of the invention relating to the method of moving a component and vice versa. Thus for example, the method may include using an actuator according to any aspect of the present invention. The actuator of the invention may possess features that would make it suitable for performing a method according to any aspect of the invention. The method may be performed on a component that forms part of an aircraft. The method may for example be performed on an aircraft.

DESCRIPTION OF THE DRAWINGS

An embodiment of the invention will now be described, by way of example only, with reference to the accompanying drawings of which.

DETAILED DESCRIPTION

Figure 1:
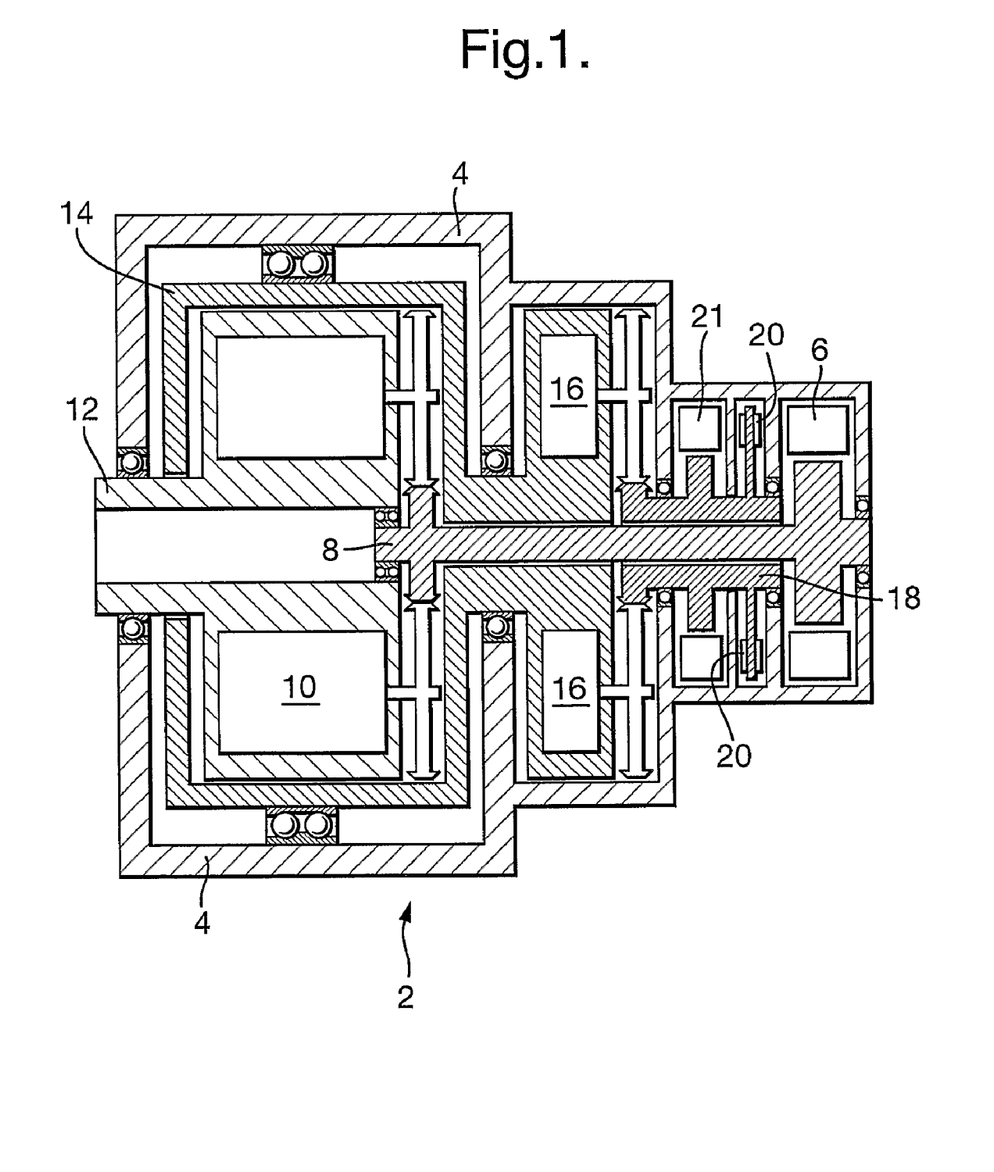
FIG. 1 is a sectional view of an actuator according to a first embodiment of the present invention.

FIG. 1 illustrates a first embodiment of the invention relating to a reconfigurable jam-tolerant electromechanical rotary actuator 2 for use as the steering actuator of a nose landing gear on a large commercial passenger aircraft. The actuator 2 comprises an outer housing 4 which is fixed to the adjacent aircraft structure (not shown). The actuator has two distinct modes of operation. The first mode of operation is the primary, and normal, mode of operation. The second mode of operation is a secondary, and back-up or emergency (such as free-castoring), mode of operation.

The actuator 2 houses an electric rotary motor 6 with a motor shaft 8 coupling the motor with a first gearbox 10. The electric motor is a bi-directional brushless DC motor, with fault-tolerant winding as necessary, able to generate a maximum torque of about 27 Nm. The first gearbox 10 converts the low torque high speed rotary motion from the motor 6 into high torque low speed motion which is output at a primary output shaft 12. The gearbox has a gearing ratio of about 500:1 and an efficiency of about 75%, and is as a result not back-driveable. The maximum output torque able to be generated at the output shaft 12 is thus about 10,000 Nm. The output shaft is connected via further gearing (having a ratio of about 4:1, thus providing an overall ratio of 2000:1) to the nose landing gear leg, and the actuator is thus able to steer the nose landing gear over a range of angles (from −95 degrees to +95 degrees). The output shaft of the actuator, when disconnected from the nose landing gear, is able to rotate freely and thus able to perform multiple revolutions without needing to counter-rotate.

The casing 14 of the first gearbox 10 is mounted for rotation relative to the housing 4 of the actuator 2. During the first mode of operation, the gearbox casing 14 is prevented from rotating. This is achieved by means of connecting the gearbox casing 14 to a secondary shaft 18 via a second gearbox 16. The second gearbox 16 is braked during the first mode of operation by means of a brake 20. The output of the second gearbox 16 is effectively integrated with the casing 14 of the first gearbox 10. The second gearbox 16 has a lower gear ratio of about 50:1, is back-driveable, and converts from low torque high speed motion at its input (i.e. at the secondary shaft 18) to high torque low speed motion at its output (i.e. at the casing 14 of the first gearbox 10). Thus, the second gearbox 16 is able to apply a high torque braking force that prevents rotation of the casing 14 of the first gearbox 10, by means of a relatively lightweight brake 20 applying a low torque. In order to react the 10,000 Nm torque generated by the first gearbox 10, the brake 20 is only required to supply a holding force of about 200 Nm (the efficiency of the gearbox not being a factor in the static condition) or more. The brake 20 is an electrically actuated brake that is activated when power is supplied and deactivated when power is not supplied. The brake 20 is also associated with a passive electromagnetic damping mechanism in the form of a damper 21, which in the first mode of operation has no effect.

Figure 2:
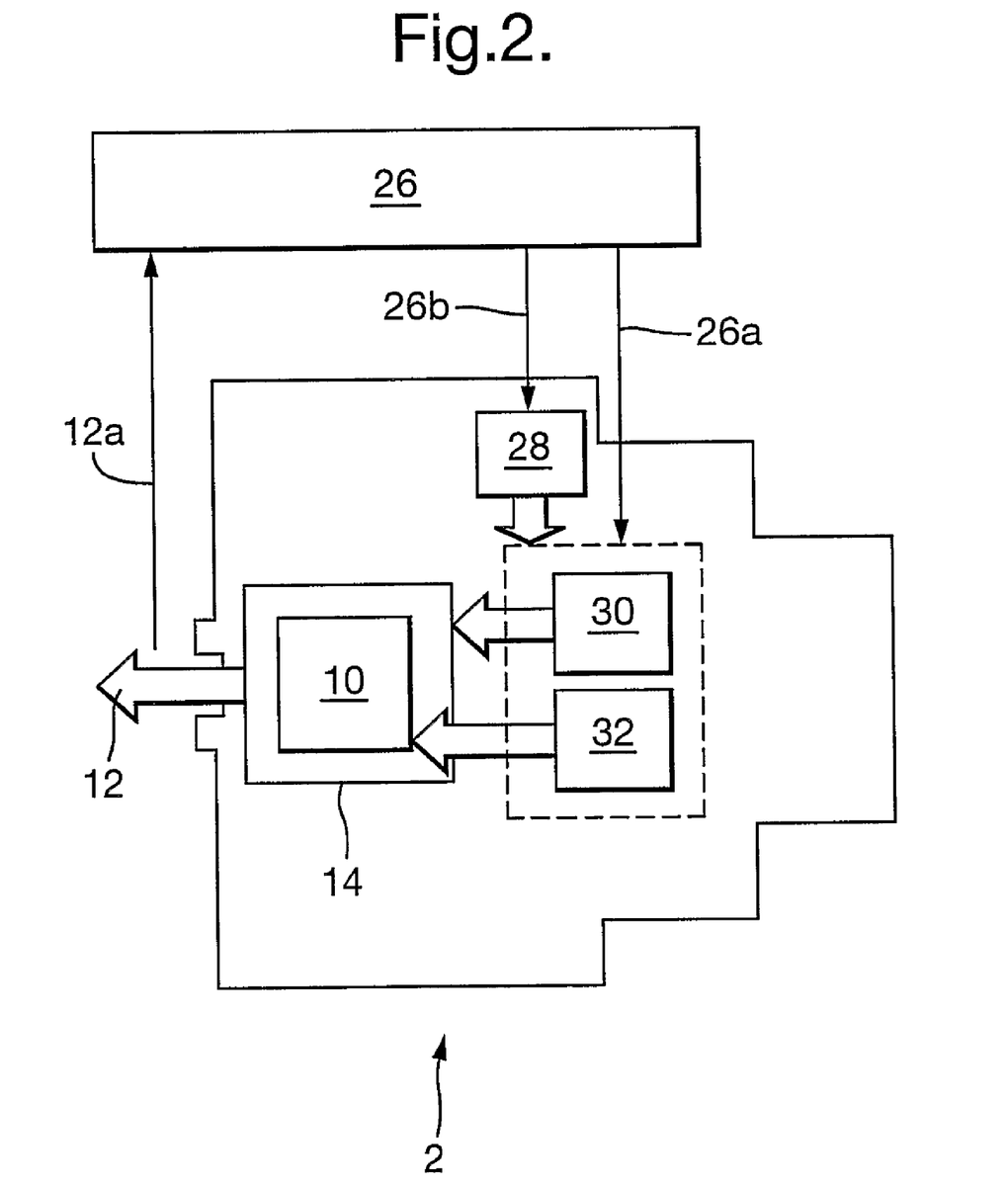
FIG. 2 is a schematic diagram of an actuator according to embodiments of the invention together with a health monitoring system.

A control unit 26, illustrated diagrammatically only by FIG. 2, including a health-monitoring system, is associated with the actuator 2. The control unit 26 receives an indication 12a of the speed of the output shaft 12 by means of a revolution counter (not shown). The control unit 26 outputs control signals 26a, 26b for controlling the operation of the motor 6 of the actuator 2 and the brake 20.

During the first mode of operation (i.e. normal operation), the gear train of the first gearbox 10 rotates independently from its casing 14 (that also happens to be the output of the second gearbox 16). The motor 6 is instructed by the control unit 26 (by means of signal 26a) to drive the first gearbox 10. The casing 14 of the gearbox 10 is substantially prevented from rotating relative to the housing 4 by means of the brake being activated upon instruction from the control unit 26 (by means of signal 26b). Thus, high-speed/low-torque rotation of the motor 6 is converted into a low-speed/high-torque rotation at the primary output shaft 12.

The output speed of the actuator (at shaft 12) is measured by the control unit 26 (by means of receiving signal 12a) and is continuously monitored in comparison to the expected output speed. In the event of a jam in the first gearbox 10, the control unit 26 receives a lower than expected indication of the speed of the output shaft 12 (in comparison to the indication expected in view of the control signals 26a, b sent from the control unit 26 to the actuator 2). In response to receiving the indication of a lower than expected speed of the shaft, the control unit 26 assumes that there has been a jam in the first gearbox 10 and changes the control signal 26b causing a switch in operation to be effected (represented by box 28). In the first embodiment, the switch of operation is in the form of ceasing the sending of signal 26b, thus causing the brake 20 to be released. This then allows the casing 14 of the actuator 2 to rotate relative to the housing 4 of the actuator, and to rotate at the same speed as, and to be interdependent with, the output of the second gearbox 16. The control signal 26a is also stopped and the motor 6 therefore receives no electric power.

In the event of a jam, the operation of the actuator thus switches from (i) the first mode of operation in which a primary means (represented by box 32 in FIG. 2), in the form of a motor 6 and first gearbox 10, drives an output shaft 12 to (ii) a secondary mode of operation in which a secondary means (represented by box 30 in FIG. 2) associated with the casing 14 of the first gearbox acts on the casing in a different way (by releasing the brake 20) in order to allow the output shaft 12 to rotate. As mentioned above, the second gear-box and the motor are both back-driveable. Thus, whilst the first gearbox 10 may be jammed, and still coupled to the output shaft 12, the output shaft may nonetheless be allowed to rotate relative to the housing 4 of the actuator 2, thereby allowing free movement of the output shaft 12. This free movement of the output shaft 12 is facilitated by the control unit causing immediate release of the brake 20 on detecting a jam in the actuator.

The motion of the output shaft 12 is damped by the passive electromagnetic damping device 21 associated with the brake 20. The ability to damp the motion of the output shaft is important in the case where the actuator operates in the second (back-up/emergency) mode of operation, because otherwise the nose landing gear may shimmy (resulting in unintentional oscillations of the nose landing gear). The nose landing gear may be considered as being in a condition of "free-castoring" during the second mode of operation of the actuator. Steering of the aircraft in that condition can be effected by means of differential braking of the main landing gear wheels.

In the event of a jam in the first gearbox, the control unit 26 automatically causes the actuator to adopt its second mode of operation. If the jam is able to be fixed then the control unit 26 may be used to cause the actuator to switch back to the first mode of operation.

The first embodiment of the invention is a low weight solution providing a jam-tolerant actuator, wherein in the event of a jam in the first gearbox, the actuator allows free-castoring of the nose landing gear. In certain applications, it may be desirable to provide an actuator able to provide drive in both the primary mode of operation and the back-up mode of operation. Such a dual redundant actuator is provided by the second embodiment of the invention shown in FIG. 3.

Figure 3:
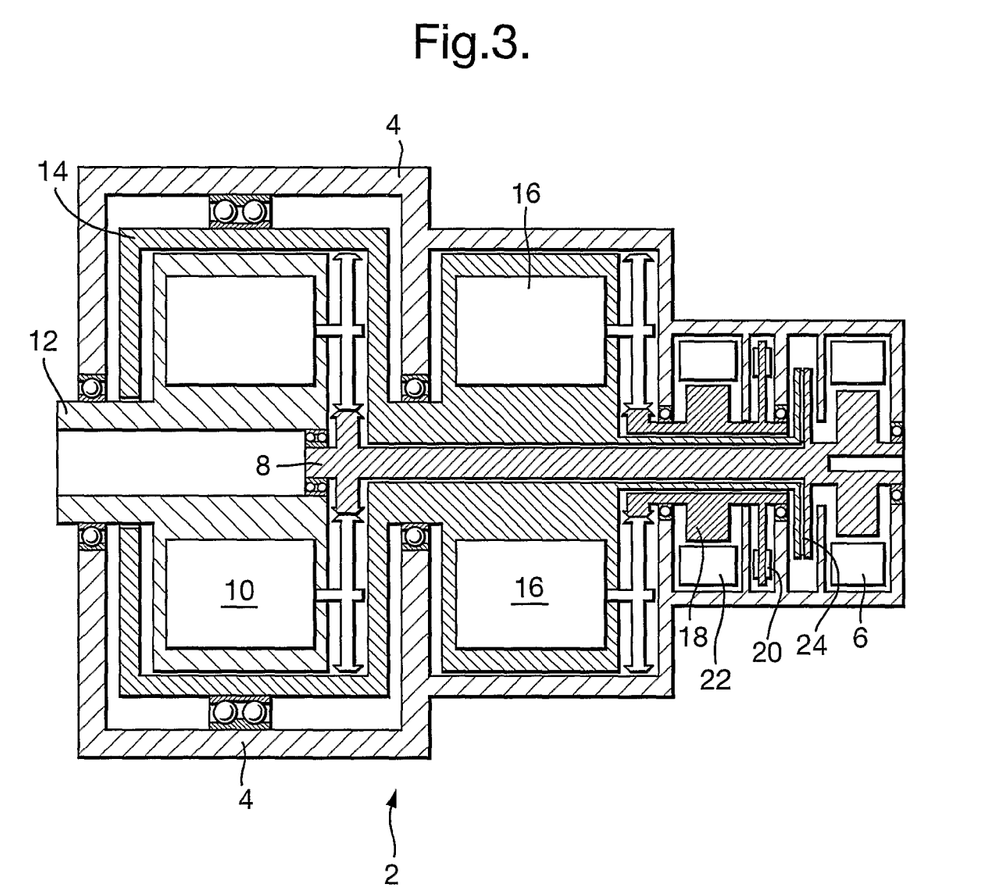
FIG. 3 is a sectional view of an actuator according to a second embodiment of the present invention.

FIG. 3 shows a reconfigurable jam-tolerant electro-mechanical rotary actuator 2 comprising two electric motors 6, 22 each able independently to provide a driving force resulting in rotary motion being outputted at the output shaft 12 of the actuator. The parts of the actuator of the second embodiment that are the same as equivalent parts of the actuator of the first embodiment are labelled with the same reference numerals. The principal differences between the actuator of the second embodiment and the actuator of the first embodiment will now be described.

In a manner similar to the first embodiment, the actuator 2 of FIG. 3 includes a first motor 6 associated with the first gearbox 10. A clutch 24 is provided enabling the first motor 6 and the casing 14 of the first gearbox to be coupled and decoupled. During the first mode of operation, the clutch 24 is released thereby decoupling the output of the first motor 6 and the casing 14 of the first gearbox 10. Also, the casing 14 is held substantially stationary, relative to the actuator housing 4, by means of the brake 20 acting on the casing 14 via the second gearbox 16. The brake 20 in this embodiment does not include any additional damping means (In any case the second motor 22 can provide active damping if and as required).

The actuator 2 of FIG. 3 includes a second motor 22 associated with the second gearbox 16. In this embodiment, the second gearbox has a high gearing ratio (equal to that of the first gearbox) and is not back-driveable. During the second mode of operation, the clutch 24 is applied thereby coupling the output of the first motor 6 and the casing 14 of the first gearbox 10. Thus, the input 8 and output 12 of the first gearbox 10 are directly coupled and made interdependent, effectively causing the gearbox 10 to behave as if completely jammed. Also, the brake 20 is released, allowing the casing 14 to rotate relative to the actuator housing 4. The second motor 22 drives the secondary shaft 18, which provides low torque high speed rotary motion to the input of the second gearbox 16, resulting in high torque low speed motion being outputted to the casing 14 of the first gearbox 10. As a result of the clutch 24 being applied effectively fully jamming the first gearbox, the output shaft 12 rotates with the casing 14. The torque of the rotary motion provided at the output shaft when driven by the second motor via the second gearbox is the same (or similar) as the torque of the rotary motion provided at the output shaft when driven by the first motor via the first gearbox. The actuator thereby provides driving motion at the output shaft, whether in the first mode of operation or the second. The second mode of operation, whilst a back-up mode of operation, may be considered as an alternative or emergency mode of operation, but is not inferior to the first mode of operation, because the first motor and first gearbox on the one hand and the second motor and second gearbox on the other hand are of equivalent function, quality and construction. However, as there are several types of gearboxes available on the market, the two gearboxes may be of different type to avoid common mode failures even though both gearboxes have similar/equivalent functions.

Providing the clutch 24, which is able to effectively jam the first gearbox 10 may be particularly useful in the event of a partial jam of the first gearbox. The clutch 24 is able to cause the shaft 12 and the casing 14 to be interdependent. In the event of a partial internal jam, allowing free relative movement between the shaft 12 and the casing 14 could cause power to be lost and diverted as a result of the internal gears of the first gearbox continuing to move and back-driving the first motor 6 at higher speed than the rotation of output shaft 12. The power output and efficiency of the actuator, in the second mode of operation, would be significantly reduced in the event of a partial jam. Also, if a fault in the first gearbox leads to intermittent jamming of the gearbox possibly resulting in jerking output motion of the actuator, it is preferable to be able to fully jam the first gearbox and switch to the second mode of operation. The clutch may be considered as defining a jamming mechanism.

In a similar manner to that of the first embodiment, the actuator 2 of the second embodiment is associated in use with a control unit that is able to detect a jam and consequently implement the back-up mode of operation. The schematic diagram of FIG. 2 may be considered as applying equally to the second embodiment. Thus, in the first mode of operation, the control unit 26 outputs a control signal 26a that causes the first motor 6 of the actuator 2 to be driven. Also, the control unit 26 outputs a control signal 26b that causes (represented by box 28) the brake 20 to be applied and the clutch 24 to be released. The first mode of operation is represented in FIG. 2 by box 32 acting on the gearbox 10 producing output 12, whilst the second mode of operation (which is represented by box 30 able to act on the casing of the gearbox 10) is suppressed (represented by box 28) on instruction from the control unit. In the event of a jam in the first gearbox 10, the control unit 26 receives (arrow 12a) a lower than expected indication of the speed of the output shaft 12. In response to receiving this indication, the control unit 26 sends a control signal 26a causing the first motor to be deactivated and the second motor to be activated. Also, the control unit 26 sends a control signal 26b causing (represented by box 28) the brake 20 to be released and the clutch 24 to be applied. The actuator thus adopts the second mode of operation, which is represented in FIG. 2 by box 30 acting on the casing 14 of the gearbox 10, whilst the first mode of operation is suppressed.

The above described embodiments of the invention have in common that they each provide an actuator comprising (a) a housing, (b) a first prime mover for producing rotary motion, (c) a first gearbox arranged in use to convert the rotary motion from the first prime mover into rotary motion having higher torque and lower speed, the first gearbox comprising a casing mounted for rotation relative to the housing of the actuator, and (d) a second gearbox arranged to convert rotary motion of the casing of the first gearbox into rotary motion having lower torque and higher speed. The actuator has at least two modes of operation. In a first mode of operation, in which the first gearbox is not jammed, the relative rotation between the casing of the first gearbox and the housing of the actuator is substantially prevented. Output motion may be provided by means of the first prime mover driving the first gearbox. The provision of a second gearbox facilitates the ability to prevent rotation of the casing of the first gearbox. In a second mode, when the second gearbox is not jammed, the casing of the first gearbox rotates relative to the housing of the actuator. Motion at the same output of the actuator, even though the first gearbox may be jammed, is allowed because the casing of the first gearbox is allowed to rotate. In certain embodiments, the second gearbox may be driven in this mode to provide driven motion at the output, whereas in other embodiments, the actuator may merely function so as not to actively prevent rotary motion the output.

Whilst the present invention has been described and illustrated with reference to particular embodiments, it will be appreciated by those of ordinary skill in the art that the invention lends itself to many different variations not specifically illustrated herein.

As a variant of the above-described second embodiment, the first and second gearboxes may have different ratios, so that the second gearbox is back-driveable. This may result in the output torque being reduced in the second mode of operation. Thus, in the event of a complete power failure, the brake would release the housing of the first gearbox and the clutch would couple the output shaft and the housing of the first gearbox (the clutch being configured so that the clutch applies in the event of loss of electric power). The output shaft could then be rotated, and would back-drive the second gearbox and the second motor. If the actuator were used to drive the steering of the nose landing gear, the aircraft could then be allowed to free-castor. Damping of that motion may be provided by means of adding an electro-mechanical damping mechanism.

The actuator may be supplied to move a component on the aircraft other than the nose landing gear.

The control unit may include a dedicated health monitoring system to detect and prevent any degradation in performances that could lead to a jam. By monitoring the actuator health and repairing any minor defects before they worsen to a state in which there would be a significant risk of jamming, the second, backup, mode of operation can be reserved strictly for emergency use only, requiring reliability over a lower number of cycles in its lifetime. Such a health monitoring system could include position, force and current sensors to monitor the forces produced by the actuator and to detect wear and degradation.

Detecting a jam by means of speed sensing may be replaced or supplemented by torque sensing or current sensing as well as position sensing.

In accordance with a further embodiment not separately illustrated, there is provided an actuator having a first drive system, comprising a first prime mover coupled via a first gearbox to the output of the actuator. There is also a second drive system comprising a second prime mover coupled via a second gearbox to the same output. When all components are functioning properly, motion from the prime movers is combined at the output thus providing a speed summing capability. When either the first or second drive systems fail (for example a gearbox jams) the motion at the output is maintained, at a reduced level, by means of the other drive system continuing to operate substantially unaffected. In accordance with this embodiment there is no need for a brake to hold the second gearbox although other brakes may be provided for other purposes. Thus the present invention also provides, in accordance with this aspect, an actuator comprising a housing, a first prime mover for producing rotary motion, a first gearbox arranged to convert in use the rotary motion from the first prime mover into rotary motion at its output having higher torque and lower speed, the first gearbox comprising a casing mounted for rotation relative to the housing of the actuator, a second prime mover for producing rotary motion and a second gearbox arranged to convert in use the rotary motion from the second prime mover into rotary motion having higher torque and lower speed and which acts on the housing of the first gearbox, whereby in use (i) when the first and second gearboxes are not jammed, both the first and second prime movers may simultaneously supply rotary motion, via the first and second gearboxes respectively, at the output of the first gearbox, and (ii) when one of either the first and second gearboxes is jammed, the output of the first gearbox may still be rotated by one of the first and second prime movers.

Where, in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional and do not limit the scope of the independent claims.

The invention claimed is:

1. An actuator, wherein the actuator comprises
    a housing,
    a first prime mover for producing rotary motion,
    a first gearbox arranged to convert in use the rotary motion from the first prime mover into rotary motion having higher torque and lower speed, the first gearbox comprising a casing mounted for rotation relative to the housing of the actuator,
    a second gearbox arranged to convert rotary motion of the casing of the first gearbox into the rotary motion having lower torque and higher speed, and
    a brake arranged to act on the rotary motion having lower torque and higher speed from the second gearbox, whereby in use
    (i) when the first gearbox is not jammed, the brake may be applied to resist relative rotation between the casing of the first gearbox and the housing of the actuator and
    (ii) when the first gearbox is jammed, the brake may be released thereby allowing the casing of the first gearbox to rotate relative to the housing of the actuator.

2. An actuator according to claim 1, wherein the first prime mover is fixed relative to the housing.

3. An actuator according to claim 1, wherein the first gearbox has a gear ratio higher than 30:1.

4. An actuator according to claim 1, wherein the second gearbox has a gear ratio lower than the first gearbox.

5. An actuator according to claim 1, wherein the actuator is so configured that the output of the first gearbox is able, in use, to produce output rotation over a range of at least +/−180 degrees.

6. An actuator according to claim 1, wherein the actuator is back-driveable in the event of the first gearbox jamming.

7. An actuator according to claim 1, wherein the actuator includes a damping mechanism arranged such that, at least when the first gearbox is jammed, the motion of the actuator is damped.

8. An actuator according to claim 1, wherein the actuator may include a second prime mover for producing rotary motion, the second prime mover being associated with the second gearbox.

9. An actuator according to claim 8, wherein the actuator includes a jamming mechanism, which is able in use to jam the first gearbox.

10. An actuator according to claim 1, wherein the actuator includes a control unit arranged to detect jamming of the first gearbox.

11. A landing gear assembly including a landing gear leg for supporting at least one wheel of an aircraft, and an actuator arranged to steer the landing gear leg, the actuator being an actuator according to claim 1.

12. An aircraft including an aircraft component and an actuator arranged to move the aircraft component, the actuator being an actuator according to claim 1.

13. A kit, comprising:
    parts for manufacturing an actuator, said actuator comprising
    a housing,
    a first prime mover for producing rotary motion,
    a first gearbox arranged to convert in use the rotary motion from the first prime mover into rotary motion having higher torque and lower speed, the first gearbox comprising a casing mounted for rotation relative to the housing of the actuator,
    a second gearbox arranged to convert rotary motion of the casing of the first gearbox into the rotary motion having lower torque and higher speed, and
    a brake arranged to act on the rotary motion having lower torque and higher speed from the second gearbox, whereby in use
    (i) when the first gearbox is not jammed, the brake may be applied to resist relative rotation between the casing of the first gearbox and the housing of the actuator and
    (ii) when the first gearbox is jammed, the brake may be released thereby allowing the casing of the first gearbox to rotate relative to the housing of the actuator.

14. A method of moving a component, wherein the method comprises the steps of
    providing input rotary motion having a first torque to a first gearbox,
    applying a counter-torque to substantially prevent rotary motion of the whole of the first gearbox, the counter-torque being applied via a second gearbox,
    the first gearbox outputting rotary motion having a second torque, higher than the first torque, which causes the component to move, and
    then, after jamming of the first gearbox,
    releasing the counter-torque applied via the second gearbox, thereby allowing the whole of the first gearbox to rotate, and thereby preventing the jamming of the first gearbox from precluding movement of the component.

15. A method according to claim 14, wherein the counter-torque is applied by means of a brake applied at the input to the second gearbox, the output of the second gearbox providing a counter-torque having a higher torque as a result of the gear ratio of the second gearbox.

16. A method according to claim 14, wherein the method includes a step, performed after jamming of the first gearbox, of moving the component by means other than via the first or second gearboxes.

17. A method according to claim 14, wherein the method includes steps of monitoring for jamming of the first gearbox, detecting jamming of the first gearbox and then consequently causing the counter-torque applied via the second gearbox to be released.

* * * * *